United States Patent

[11] 3,599,119

[72] Inventors William G. Crouse; Phillip R. Epley, both of Raleigh, N.C.

[21] Appl. No. 828,906

[22] Filed May 29, 1969

[45] Patented Aug. 10, 1971

[73] Assignee International Business Machines Corporation Armonk, N.Y.

[54] AMPLITUDE CONTROL CIRCUIT FOR RESONISTOR OSCILLATOR
3 Claims, 5 Drawing Figs.

[52] U.S. Cl. .......... 331/116, 307/264, 331/156, 331/182

[51] Int. Cl. .......... H03b 5/36

[50] Field of Search .......... 331/116, 116 M, 15, 154—156, 182; 307/264; 84/1.04, 1.15

[56] References Cited

UNITED STATES PATENTS

| | | | |
|---|---|---|---|
| 2,300,271 | 10/1942 | Whitaker .......... | 331/156 |
| 3,393,377 | 7/1968 | Clapp et al. .......... | 331/116 M |
| 3,470,401 | 9/1969 | Hetzel .......... | 331/156 X |

*Primary Examiner*—Alfred L. Brody
*Attorneys*—Hanifin and Jancin and Delbert C. Thomas

ABSTRACT: An automatic gain control circuit for a resonistor, i.e., a mechanical oscillator, formed from a single silicon crystal, can be diffused directly into the crystal. The circuit requires no phase reactive components and the entire oscillatory unit can be fabricated by monolithic circuit techniques.

INVENTORS
WILLIAM G. CROUSE
PHILLIP R. EPLEY

BY Delbert C. Thomas
ATTORNEY

PATENTED AUG 10 1971

3,599,119

AMPLITUDE CONTROL CIRCUIT FOR RESONISTOR OSCILLATOR

This invention relates to mechanical resonators for the audio and near audio frequencies and more particularly to an automatic amplitude control device for such a resonator. A particular mechanical resonator constructed of a formed from a silicon crystal is known as a resonistor and was described in a paper presented by Wilfinger, Bardell and Chhabra in the Oct. 26—28, 1966 International Electron Devices Meeting at Washington D. C. The resonistor described therein comprised a silicon beam fixed at one end and mechanically resonant. An electric current is passed through a diffused resistive area of the beam near the fixed point to provide localized heating and cause deflection of the beam. It was found that silicon has different piezoresistive effects on the different crystallographic faces and that on the (100) crystal face, elements having a maximum stress sensitivity and opposite changes may be fabricated. Four such resistive units connected as a bridge provided a measure of the actual beam deflection. The output of the bridge is passed through an amplifier, preferably formed in a conventional manner in the silicon crystal as a monolithic circuit, and the amplifier output is the current for the resistive heating area. As there is a delay between the first current application through the heating area and the bending of the beam due to expansion of the heated silicon, the heating effect can be synchronous with the velocity, not displacement, of the beam as is required for positive feedback. Such a resonistor has been found to have a Q of from 250 at 200 kHz. to as high as 4400 at the 1 to 2 kHz. range.

In resonistors of this type, it is necessary to maintain the vibration of the beam to a small amplitude to avoid mechanical damage to the beam or to its crystallographic structure. Amplitude control circuits for oscillators are known in which the phase of the feedback relative to the movement of the resonator is variable to change the effective driving power. Such control circuits have required reactive components to control the phase change. Since reactive components such as capacitors and inductors are not available in monolithic circuits with the large values required for the desired frequency range, another type of amplitude control is needed for the resonistor type of oscillator

OBJECTS OF THE INVENTION

It is therefore an object of this invention to provide a circuit for controlling the drive for a mechanical oscillator to maintain the amplitude of oscillation within desired limits.

Another object is the provision of such a circuit which contains no reactive components for controlling the phase of the driving power.

A still further object is the provision of an automatic amplitude control circuit for a resonistor which can be manufactured by monolithic techniques on the resonistor beam.

Still another object is the provision of an inexpensive monolithic structure combining both mechanical oscillation and an electrical circuit for controlling the amplitude of oscillation.

The foregoing and other objects, features and advantages of the invention will be apparent from the following more particular description of a preferred embodiment of the invention as illustrated in the accompanying drawings.

DRAWINGS

In the drawings:

FIG. 1 is a view of the resonistor and indicates the placement thereon of the electrical elements, FIG. 2 is a diagrammatic showing of the electrical components, FIG. 3 is a schematic showing of the circuit of the amplitude limiting circuit, FIG. 4 is a showing of the circuit of FIG. 3 as fabricated in a monolithic circuit, and FIG. 5 is a graph showing the timing relationship between the signals of the circuits.

DESCRIPTION OF PREFERRED EMBODIMENTS

Figure 1:
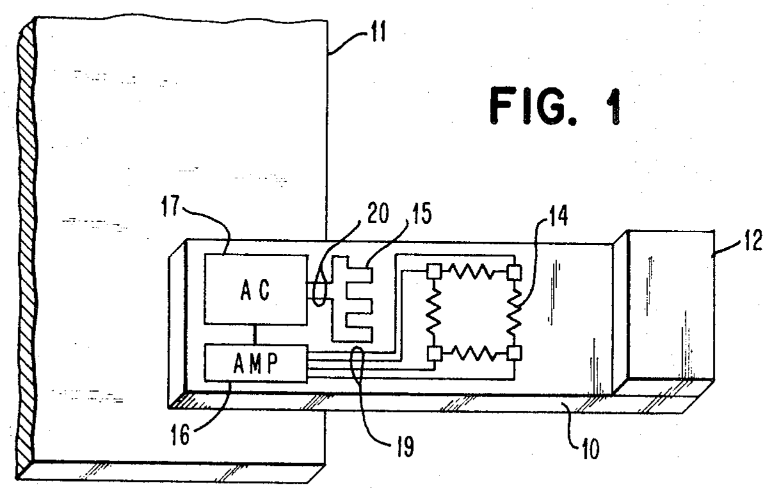

As above indicated, a resonistor is a silicon cantilever beam fixed at one end and free to vibrate at the other. As shown in FIG. 1, the silicon bar 10 is secured by solder or adhesive to a fixed pedestal 11. The bar 10 will be a single crystal as is usual in monolithic circuits and may have an additional mass 12 secured to its free end when it is desired to lower its resonant frequency. Conductive circuits formed by diffusion of impurities into the bar 10 are indicated as a resistance bridge 14, a heater resistance 15, an amplifier 16, and an amplitude control 17. The bar 10 is cut with its flat side parallel to the (100) crystal face and has the resistance bridge elements diffused thereon so that adjacent elements have resistance changes of opposite sign when the bar 10 is deflected. The bridge 14 is connected by conductors 19 (printed leads or highly doped regions to the power supply and amplifier 16.

The heater 15 is similarly a region of the bar 10 above the edge of pedestal 11 and has sufficient impurities diffused therein to decrease its electrical resistance to a desired value. It is connected by conductive lines 20 to the amplitude control 17. Amplifier 16 is on the stationary part of bar 10 and is responsive to the unbalance of bridge 14. Any suitable monolithic amplifier circuit may be used but in view of the two approximately equal and opposite bridge outputs, a conventional differential amplifier to eliminate stray electrical coupling and temperature effects is preferred.

Figure 2:
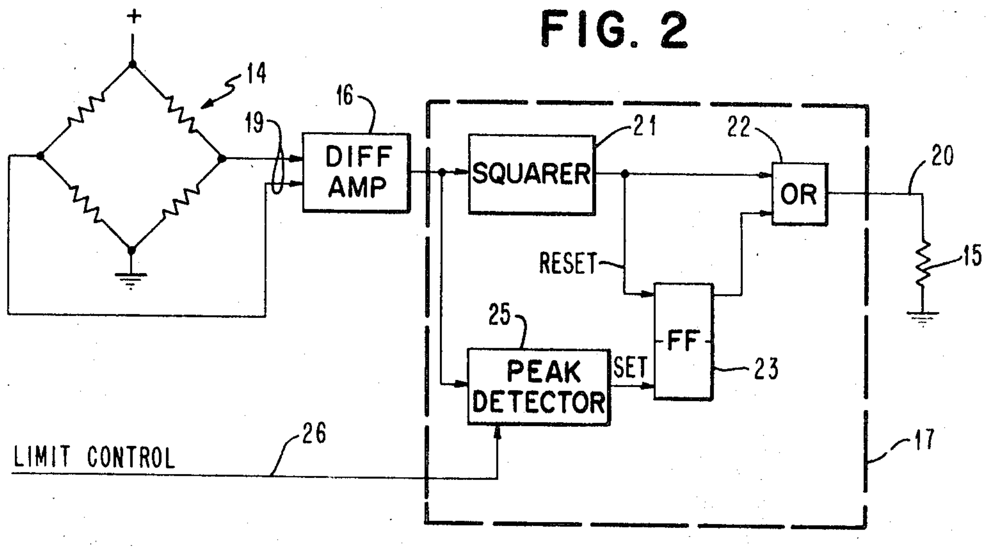

The amplitude control 17 is connected between amplifier 16 and heater 15 squarer control the effective amount of energy supplied to heater 15. As indicated in FIG. 2, the amplitude control 17 comprises a squaring circuit 21 to convert the sinusoidal output of amplifier 16 to an inphase square pulse output. An OR circuit 22 receives the output of squarer 21 and controls the current through heater 15 so that when any input to OR 22 is at a significant voltage level, current is supplied to heater 15. A flip-flop circuit 23 is connected to another input of OR 22 and has its reset input connected to the output of squarer 21 so that flip-flop 23 is normally reset each time the output of squarer 21 is at a significant level. A peak detector 25 having the output of amplifier 16 and a limit control voltage on a conductor 26 as inputs has its output as the set input of flip-flop 23. Detector 25 will provide a significant output voltage whenever the amplitude of the output of amplifier 16 exceeds the limit control voltage on conductor 26. Such an output of detector 25 will set flip-flop 23 to provide a control signal to OR 22 and provide current to heater 15.

Figure 5:
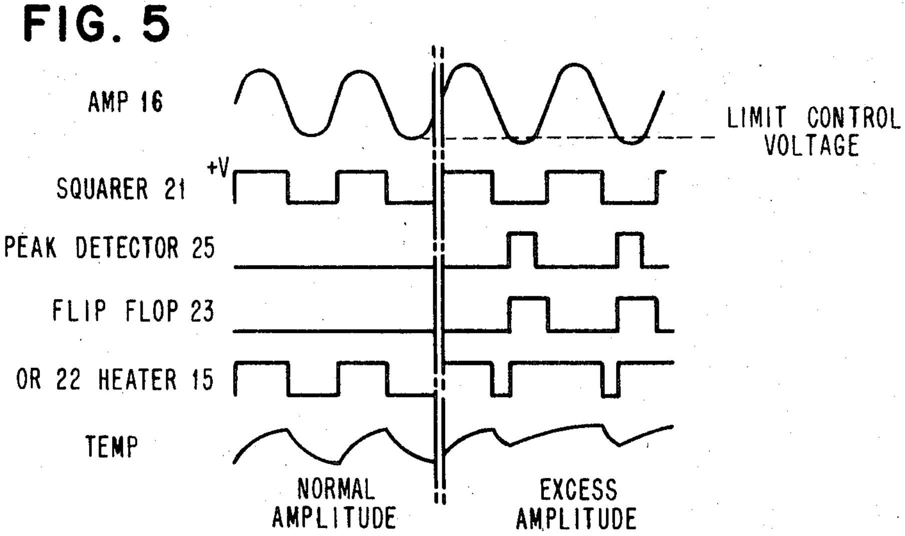

FIG. 5 shows the relationship between the signals generated by the different sections. The output of amplifier 16 is shown as approximating a sine wave for both the designed amplitude and for an excessive amplitude oscillation of of bar 10. This output of amplifier 16 controls the output of squarer 21 to provide the square pulse signal of the second line. There will be no substantial difference in this output for the excessive amplitude periods. The third line shows the output of the peak detector 25 which will generate a signal only when the negative peaks of the output of amplifier 16 are more negative tan the limit control voltage, thereby indicating an excessive oscillation amplitude. The fourth line is the output of flip-flop 23 which will be set by the positive signal of the peak detector 25 and reset by that of squarer 21. The output of OR 22 on line five is the combination of the positive signals of lines two and four and represents the periods of current flow in heater 15. The last line indicates the temperature fluctuations in the heater part of the beam 10. The remainder of the beam will approach an average temperature gradient and although this may distort beam 10 slightly, it will not have an appreciable effect on the resonating frequency.

It will be noted from a comparison of lines five and six, that for the normal amplitude the temperature fluctuations lag the application of current from OR 22 by a substantial phase difference, approximately 90° after the motion of bar 10 indicated on the first line and the phase difference needed for efficient feedback. In contrast, when the amplitude becomes excessive, it will be noted that the temperature variations become smaller and that the effective phase shifts from the most efficient 90° phase difference. Both of these effects reduces the energy available for driving the bar 10, thus causing the amplitude for oscillation to decrease until normal amplitude is again reached at which time the full driving power will be applied. Thus the amplitude of oscillation is controlled by using a normal drive capable of causing an excessive oscillation and adding to that drive an out of phase component to decrease the effective drive when an over limit oscillatory amplitude is detected.

Figure 3:
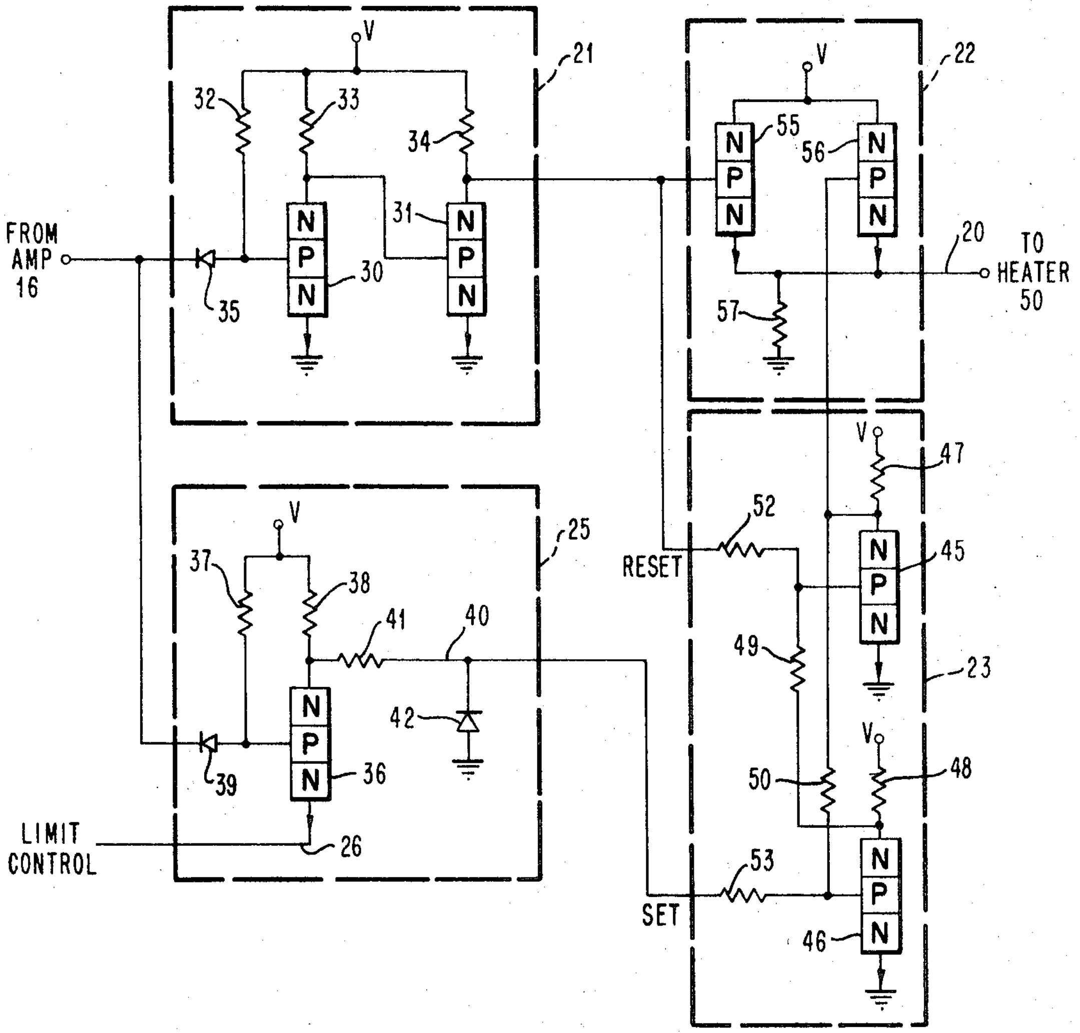

FIG. 3 is a diagram of the circuit of the amplitude control 17. The squarer 21 is shown as two transistors 30 and 31 having their emitters grounded. A voltage source is connected to the base of transistor 30 through a resistor 32 and to the collectors of both transistors through resistors 33 and 34. The base of transistor 31 is connected to the collector of transistor 30. With these connections, transistor 30 is normally conductive and 31 is normally off so that the voltage at the collector of transistor 31 is high. A diode 35 is connected between the output of amplifier 16 and the base of transistor 30 so that whenever the output of amplifier 16 is below the emitter voltage, i.e., ground level, the conductive conditions of transistors 30 and 31 are reversed and the output at the collector of transistor 30 drops to a nonsignificant level.

The peak detector 25 is a single transistor 36 having its emitter connected to the limit control voltage line 26 and its base and collector connected to the voltage source through resistors 37 and 38 respectively so that the transistor is normally conductive with its collector at a nonsignificant level. A diode 39 from the base of transistor 36 to the output of amplifier 16 causes the transistor 36 to cease conducting when the output of amplifier 16 applied through diode 39 to the base of transistor 36 becomes more negative than the transistors emitter voltage on the limit control line 26. The output line 40 is connected to the collector through a resistor 41 and to the ground level through a diode 42 to prevent the output from going negative.

The flip-flop 23 comprises two transistors 45 and 46, each having its collector connected to a voltage source through a resistor 47 and 48 respectively and its base connected to the collector of the other transistor through a resistor 49 and 50 respectively. The base of transistor 45 is also connected via a resistor 52 to the output of squarer 21 and the base of transistor 46 is also connected via a resistor 53 to the output of the peak detector 25. In operation, one transistor will be conductive and this condition will apply a low voltage to the base of the other transistor holding it nonconductive. A positive pulse applied to the base of the nonconductive transistor will turn it on lowering its collector voltage to turn off the other transistor which then has its collector voltage go up. This higher collector voltage when fed back to the base of the originally nonconductive transistor holds it conductive until a positive pulse is applied to the base of the now nonconductive transistor which again reverses the state of these two transistors 45 and 46. As shown, a pulse through resistor 52 will reset the flip-flop 23 by rendering transistor 45 conductive and lowering its collector voltage. A p8lse from peak detector 25 through resistor 53 will set the flip-flop 23 by rendering transistor 46 conductive which turns off transistor 45 to raise its collector voltage to a significant level.

The OR 22 comprises two transistors 55 and 56 connected in a common emitter follower connection with both collectors connected to the voltage source, and the emitters connected together and to ground through a resistor 57. One lead 20 from the common emitter goes to the heater 15 which will have a resistance substantially lower than that of resistor 57 so that most of the heat will be generated in heater 15. The base of transistor 55 is connected to the output of squarer 21 and the base of transistor 56 is connected to the set output of flip-flop 23. When the voltage of one of these bases is raised, its transistor conducts to pass current through heater 15 to deflect the bar 10.

Figure 4:
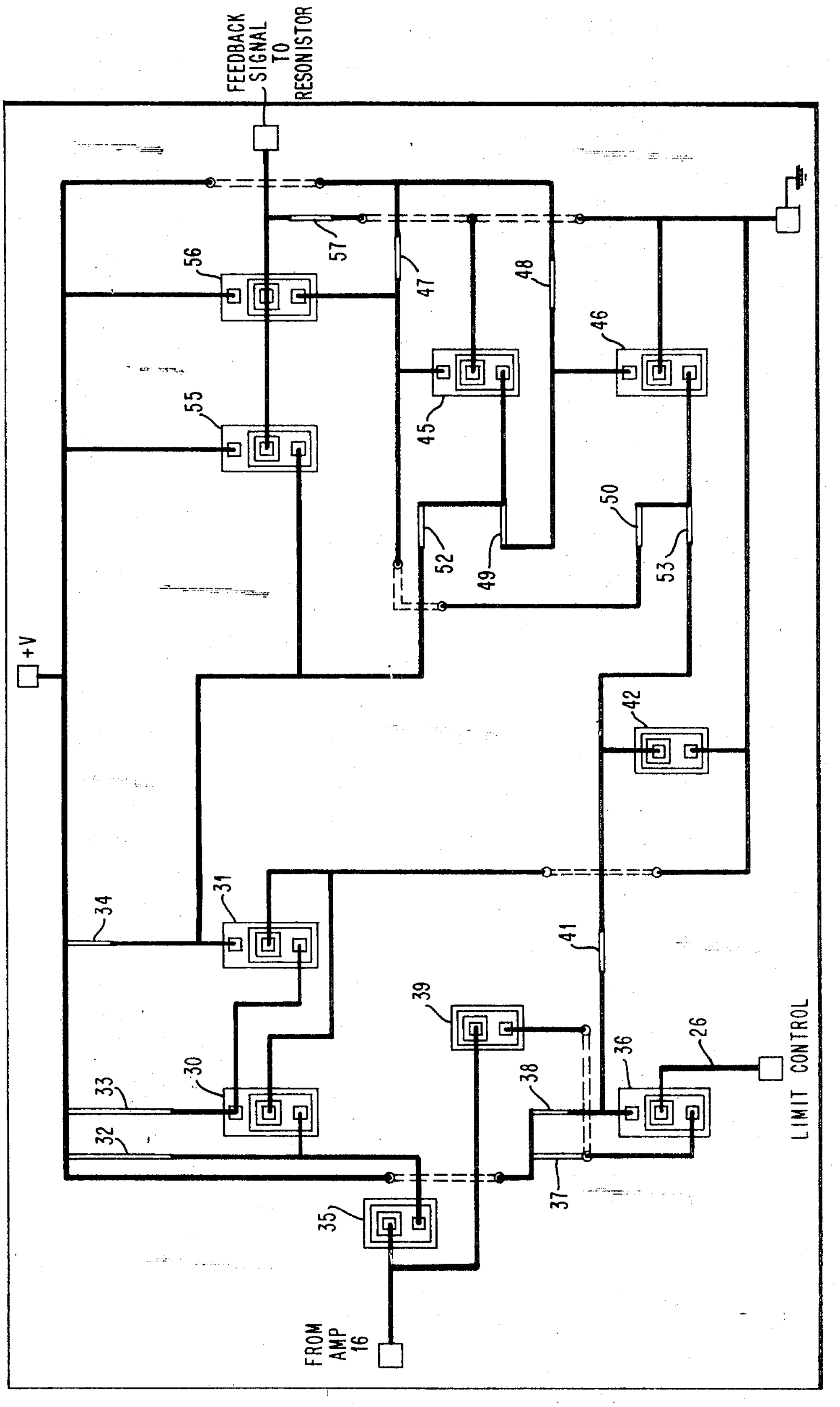

FIG. 4 indicates one layout for fabricating the circuit of FIG. 3 on the silicon bar 10. The conductors may be formed by a heavy diffusion of impurities and the resistors indicated as open areas of the conductors will have only sufficient impurities to reduce the intrinsic silicon resistance to the desired resistance values or conductors may be formed by printed conductive strips over insulation except where a silicon contact is desired. The major difficulty with such a fabrication comes where two conductors cross each other. One way in which the conductors may be insulated from each other is by putting a layer of insulation on a conductor on the substrate and jumpering the other over the insulation by a metallic type conductor printed across the insulation or soldered across the ends of the other conductor. Another way is to diffuse a highly conductive region through the substrate at each end of a gap in one diffused conductor and to complete the circuit by a diffused conductor on the reverse side of the bar 10. Such jumper sections are indicated by circles at the ends of the conductors to be broken and a dotted line connection between the circles to represent the jumper. Transistors are fabricated by the usual diffusion processes using masking and are used as diodes by leaving open the collector connection. The components of FIG. 4 have been identified by reference numbers and as the function of these parts has been previously described with reference to FIG. 3, no additional description is needed for description of FIG. 4.

While the invention has been particularly shown and described with reference to a preferred embodiment thereof, it will be understood by those skilled in the art that various changes in form nd details may be made therein without departing from the spirit and scope of the invention.

What we claim is:

1. In a mechanical oscillator formed of an elongated vibratory crystalline semiconductor having a deflection sensing device and a deflecting area fabricated integrally therewith, the invention comprising;
   - a control connection to supply an oscillation amplitude control voltage and
   - an amplitude controlling monolithic circuit for said oscillator, said circuit including;
   - a squaring circuit to convert the output of said sensing device to a square wave,
   - a peak detector responsive to said control voltage and the output of said sensing device to provide a signal when the output of said sensing device exceeds said amplitude control voltage
   - a bistable circuit settable by said signal from said peak detector and resettable by the positive going transitions of said square wave, and
   - an OR circuit receiving the square wave output of said squaring circuit to supply driving power to said deflecting area and receiving the output of said bistable circuit to reduce the action of said driving power.

2. An oscillating device as in claim 1 in which said squaring circuit comprises a high gain amplifier biased to normally generate an output voltage and having an input circuit connected to said deflection sensing device to cut off said output voltage during deflections of said oscillator in one direction from a mean position.

3. In a combined mechanical oscillator and monolithic circuit for driving said oscillator, said circuit including a resistive area for thermally deflecting said oscillator and a piezoresistive area for sensing deflections of said oscillator, the improvement of an amplitude controlling portion in said monolithic circuit, said amplitude controlling portion including
   - a square pulse-generating circuit to provide an output voltage when said oscillator deflects in one direction from a mean position,
   - a voltage connection to receive a voltage presettable to indicate a predetermined limit of oscillation o said oscillator;

a peak detector portion to receive said presettable voltage and the output of said sensing area provide an output signal voltage when the amplitude of oscillation of said oscillator exceeds said predetermined limit, a bistable state circuit settable by said output signal of said peak detection portion and resettable at the onset of said square pulse, and an OR circuit responsive to said square pulses and to the set output of said bistable circuit to provide oscillator driving current to said deflecting area.